United States Patent [19]
Gavia

[11] Patent Number: 5,904,453
[45] Date of Patent: May 18, 1999

[54] DRILL AND VACUUM COMBINATION

[76] Inventor: Cesar Gavia, 5672 Kingman Ave., Buena Park, Calif. 90621

[21] Appl. No.: 08/992,562

[22] Filed: Dec. 17, 1997

[51] Int. Cl.$^6$ ..................................... B23B 47/34
[52] U.S. Cl. ............................. 408/67; 408/124
[58] Field of Search ................. 408/67, 72 R, 408/124

[56] References Cited

U.S. PATENT DOCUMENTS

| 4,209,069 | 6/1980 | Smith | 408/67 |
| 4,921,375 | 5/1990 | Famulari | 408/67 |
| 5,113,951 | 5/1992 | Houben et al. | 408/67 |
| 5,467,835 | 11/1995 | Obermeier et al. | 408/67 |
| 5,653,561 | 8/1997 | May | 408/67 |

FOREIGN PATENT DOCUMENTS

| 2940362 | 4/1981 | Germany | 408/67 |
| 4030067 | 3/1992 | Germany | 408/67 |
| 1334366 | 10/1973 | United Kingdom | 408/67 |

*Primary Examiner*—Daniel W. Howell

[57] ABSTRACT

A drill vacuum combination is provided including a drill having an inverted L-shaped configuration with a vertical handle including a trigger for generating an activation signal upon the depression thereof. The drill further has a horizontal upper extent with a rotating adjustable drill chuck rotatably mounted to a front face thereof and adapted to releasably receive a drill bit therein. The drill chuck is adapted to rotate during the receipt of the activation signal. A tube is situated in concentric relationship with the drill chuck. A vacuum assembly is mounted on the drill and in communication with the tube for generating a vacuum upon the receipt of the activation signal. Finally, a switch is mounted on the drill having a first orientation for only allowing the transmission of the activation signal to the drill chuck, a second orientation for only allowing the transmission of the activation signal to the vacuum assembly, and a third orientation for allowing the transmission of the activation signal to both the drill chuck and vacuum assembly.

11 Claims, 2 Drawing Sheets

DRILL AND VACUUM COMBINATION

BACKGROUND OF THE INVENTION

1. Field of the Invention

The present invention relates to drill-mounted dust vacuums and more particularly pertains to a new drill and vacuum combination for collecting dust generated by use of a drill.

2. Description of the Prior Art

The use of drill-mounted dust vacuums is known in the prior art. More specifically, drill-mounted dust vacuums heretofore devised and utilized are known to consist basically of familiar, expected and obvious structural configurations, notwithstanding the myriad of designs encompassed by the crowded prior art which have been developed for the fulfillment of countless objectives and requirements.

Known prior art drill-mounted dust vacuums include U.S. Pat. No. 5,199,501; U.S. Pat. No. 4,921,375; U.S. Pat. No. 5,090,499; U.S. Pat. No. 5,129,647; U.S. Pat. No. 5,160,230; and U.S. Pat. Des. 264,930.

In these respects, the drill and vacuum combination according to the present invention substantially departs from the conventional concepts and designs of the prior art, and in so doing provides an apparatus primarily developed for the purpose of collecting dust generated by use of a drill.

SUMMARY OF THE INVENTION

In view of the foregoing disadvantages inherent in the known types of drill-mounted dust vacuums now present in the prior art, the present invention provides a new drill and vacuum combination construction wherein the same can be utilized for collecting dust generated by use of a drill.

The general purpose of the present invention, which will be described subsequently in greater detail, is to provide a new drill and vacuum combination apparatus and method which has many of the advantages of the drill-mounted dust vacuums mentioned heretofore and many novel features that result in a new drill and vacuum combination which is not anticipated, rendered obvious, suggested, or even implied by any of the prior art drill-mounted dust vacuums, either alone or in any combination thereof.

To attain this, the present invention generally comprises a drill having an inverted L-shaped configuration. Such drill is equipped with a vertical handle including a trigger for generating an activation signal upon the depression thereof. The drill further has a horizontal upper extent with a rotating adjustable drill chuck rotatably mounted to a front face thereof. Such drill chuck serves to releasably receive a drill bit therein. In use, the drill chuck is adapted to rotate during the receipt of the activation signal. For reasons that will soon become apparent, the front face of the horizontal upper extent further has an annular sleeve mounted in concentric relationship with the drill chuck. The sleeve has a pair of diametrically opposed locking tabs extending therefrom. Next provided is a cylindrical tube formed of an elastomeric material. The tube has a bellowed periphery and a spring integrally formed within the tube. Such spring resides along a helix defined by an apex of each bellowed portion of the tube for urging the tube to a full length thereof. An end of the tube has a rigid sleeve with a pair of diametrically opposed bores for releasably receiving the locking tabs of the annular sleeve. When the sleeves are coupled, the tube is maintained in concentric relationship with the drill chuck. Also included is a vacuum assembly having a plastic sealed container removably mounted on a lower surface of the horizontal upper extent of the drill. The container has an interior space which resides in communication with the tube via a pair of bores formed in the annular sleeve of the drill and the rigid sleeve of the tube, respectively. The container further has a bag adapter therein with a first open end in communication with the pair of bores and a second open end. A vacuum bag is situated within the container with an opening removably connected to the second open end of the bag adapter. It is imperative that the bag be air permeable. The vacuum assembly further includes a vacuum pump mounted within the horizontal upper extent and in communication with the container for creating a vacuum within the container, bag and cylindrical tube upon the receipt of the activation signal. Finally, a switch is mounted on a top surface of the horizontal upper extent of the drill. The switch has a first orientation for only allowing the transmission of the activation signal to the drill chuck and a second orientation for only allowing the transmission of the activation signal to the vacuum assembly. For allowing the combined use of the vacuum and drill, the switch has a third orientation for allowing the transmission of the activation signal to both the drill chuck and vacuum assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new drill and vacuum combination apparatus and method which has many of the advantages of the drill-mounted dust vacuums mentioned heretofore and many novel features that result in a new drill and vacuum combination which is not anticipated, rendered obvious, suggested, or even implied by any of the prior art drill-mounted dust vacuums, either alone or in any combination thereof.

It is another object of the present invention to provide a new drill and vacuum combination which may be easily and efficiently manufactured and marketed.

It is a further object of the present invention to provide a new drill and vacuum combination which is of a durable and reliable construction.

An even further object of the present invention is to provide a new drill and vacuum combination which is susceptible of a low cost of manufacture with regard to both materials and labor, and which accordingly is then susceptible of low prices of sale to the consuming public, thereby making such drill and vacuum combination economically available to the buying public.

Still yet another object of the present invention is to provide a new drill and vacuum combination which provides in the apparatuses and methods of the prior art some of the advantages thereof, while simultaneously overcoming some of the disadvantages normally associated therewith.

Still another object of the present invention is to provide a new drill and vacuum combination for collecting dust generated by use of a drill.

Even still another object of the present invention is to provide a new drill and vacuum combination that includes a drill having an inverted L-shaped configuration with a vertical handle including a trigger for generating an activation signal upon the depression thereof. The drill further has a horizontal upper extent with a rotating adjustable drill chuck rotatably mounted to a front face thereof and adapted to releasably receive a drill bit therein. The drill chuck is adapted to rotate during the receipt of the activation signal. A tube is situated in concentric relationship with the drill chuck. A vacuum assembly is mounted on the drill and in communication with the tube for generating a vacuum upon the receipt of the activation signal. Finally, a switch is mounted on the drill having a first orientation for only allowing the transmission of the activation signal to the drill chuck, a second orientation for only allowing the transmission of the activation signal to the vacuum assembly, and a third orientation for allowing the transmission of the activation signal to both the drill chuck and vacuum assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
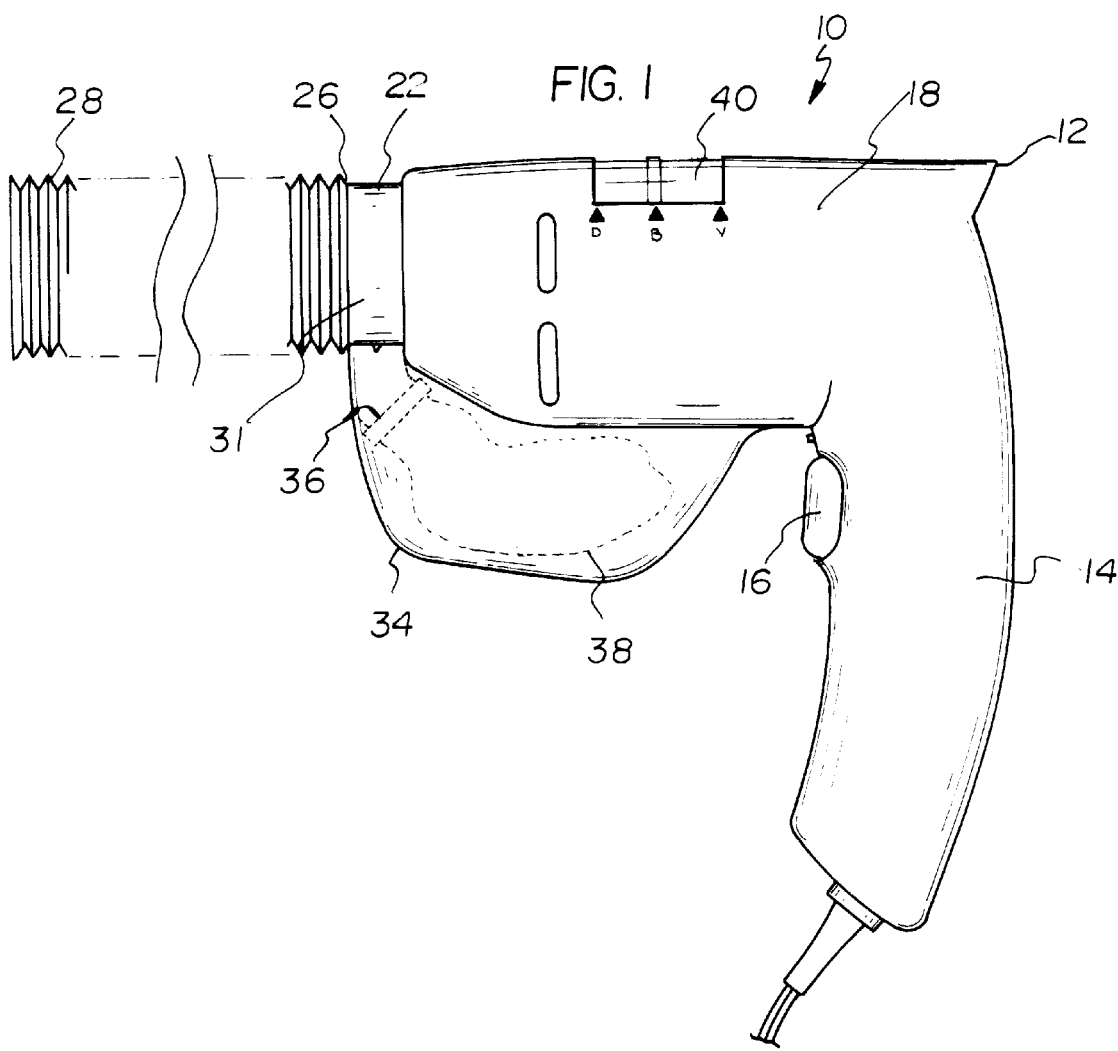
FIG. 1 is a side view of a new drill and vacuum combination according to the present invention.
Figure 2:
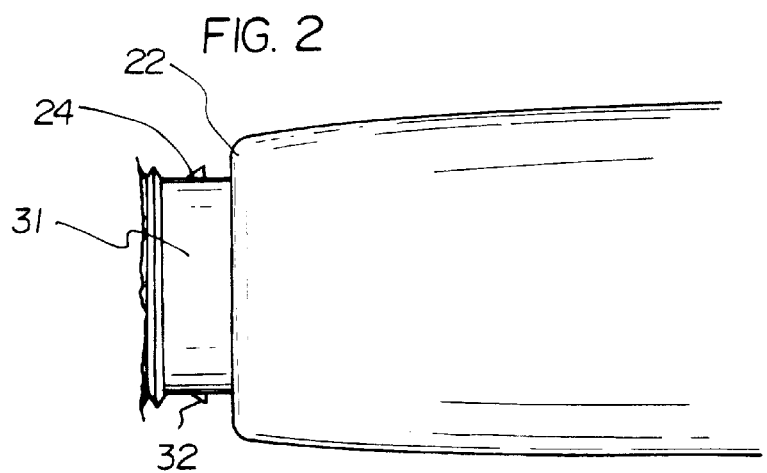
FIG. 2 is a top view of the present invention.
Figure 3:
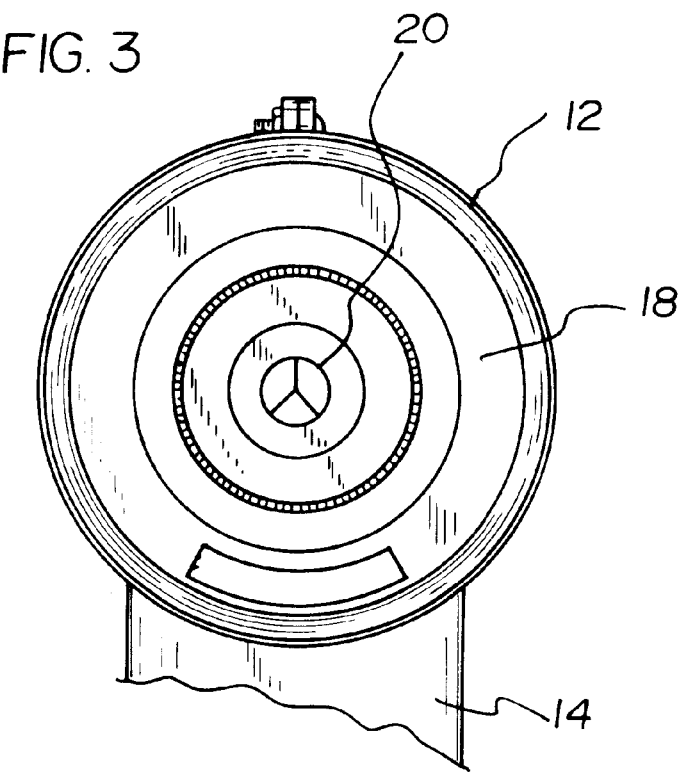
FIG. 3 is a front view of the present invention.
Figure 4:
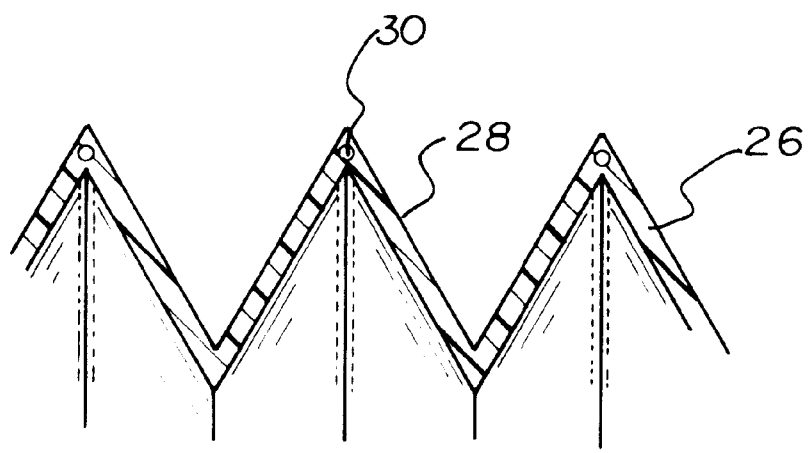
FIG. 4 is a cross-sectional view of the tube of the present invention.

With reference now to the drawings, and in particular to FIGS. 1 through 4 thereof, a new drill and vacuum combination embodying the principles and concepts of the present invention and generally designated by the reference numeral 10 will be described.

The present invention, as designated as numeral 10, includes a drill 12 having an inverted L-shaped configuration. Such drill is equipped with a slightly arcuate vertical handle 14 including a trigger 16 on a front face thereof for generating an activation signal upon being depressed. The drill further has a horizontal upper extent 18 with a rotating adjustable drill chuck 20 rotatably mounted to a front face thereof. Such drill chuck serves to releasably receive a drill bit therein. In use, the drill chuck is adapted to rotate during the receipt of the activation signal. For reasons that will soon become apparent, the front face of the horizontal upper extent further has an annular sleeve 22 mounted in concentric relationship with the drill chuck. The sleeve has a pair of diametrically opposed locking tabs 24 extending therefrom. It is also important that the sleeve be of a length that is greater than the drill chuck.

Next provided is a cylindrical tube 26 formed of an elastomeric material. The tube has a bellowed periphery 28 and a spring 30 integrally formed within the tube. Such spring resides along a helix defined by an apex of each bellowed portion of the tube for urging the tube to a full length thereof. An end of the tube has a rigid sleeve 31 with a pair of diametrically opposed bores 32 for releasably receiving the locking tabs of the annular sleeve. When the sleeves are coupled, the tube is maintained in concentric relationship with the drill chuck. In the preferred embodiment, the tube is transparent and further has measurement indicia printed along a length thereof. In alternate embodiments, tubes of various lengths may be employed.

Also included is a vacuum assembly having a plastic sealed container 34 with a generally dome-shaped configuration. Such container is removably mounted on a lower surface of the horizontal upper extent of the drill. The container has an interior space which resides in communication with the tube via a pair of bores formed in the annular sleeve of the drill and the rigid sleeve of the tube, respectively. The container further has a bag adapter 36 therein with a first open end in communication with the pair of bores and a second open end. A vacuum bag 38 is situated within the container with an opening removably connected to the second open end of the bag adapter. It is imperative that the bag be air permeable. The vacuum assembly further includes an unillustrated vacuum pump mounted within the horizontal upper extent of the drill and in communication with the container for creating a vacuum within the container, bag and cylindrical tube upon the receipt of the activation signal. To allow for continuous air flow, an end of the tube is preferably equipped with screened apertures.

Finally, a switch 40 is mounted on a top surface of the horizontal upper extent of the drill. The switch has a first orientation for only allowing the transmission of the activation signal to the drill chuck and a second orientation for only allowing the transmission of the activation signal to the vacuum assembly. To allow such operation, the vacuum pump and drill chuck each have a separate motor or each have a gear removably engaged with a central driver. For allowing the combined use of the vacuum and drill, the switch has a third orientation for allowing the transmission of the activation signal to both the drill chuck and vacuum assembly.

During use, a user may choose to remove either the tube or drill bit for use of the present invention as either a drill or vacuum, respectively. As an option, both attachments may be attached for combined use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A drill vacuum combination comprising:

a drill having an inverted L-shaped configuration with a vertical handle including a trigger for generating an activation signal upon the depression thereof, the drill further having a horizontal upper extent with a rotating adjustable drill chuck rotatably mounted to a front face thereof and adapted to releasably receive a drill bit therein, the drill chuck adapted to rotate during the receipt of the activation signal, the front face of the horizontal upper extent further having an annular sleeve mounted in concentric relationship with the drill chuck with a pair of diametrically opposed locking tabs extending therefrom;

a cylindrical tube formed of an elastomeric material that has a bellowed periphery and a spring integrally formed within the tube wherein the spring resides along a helix defined by an apex of each bellowed portion of the tube for urging the tube to a full length thereof, an end of the tube having a rigid sleeve with a pair of diametrically opposed bores for releasably receiving the locking tabs of the annular sleeve such that the tube resides in concentric relationship with the drill chuck;

a vacuum assembly including a plastic sealed container mounted on a lower surface of the horizontal upper extent of the drill, the container having an interior space which resides in communication with the tube via a pair of bores formed in the annular sleeve of the drill and the rigid sleeve of the tube, respectively, the container further having a bag adapter having a first open end in communication with the pair of bores and a second open end, the vacuum assembly further including a vacuum bag situated within the container with an opening removably connected to the second open end of the bag adapter with the bag being air permeable, the vacuum assembly further including a vacuum pump mounted within the horizontal upper extent and in communication with the container for creating a vacuum within the container, bag and cylindrical tube upon the receipt of the activation signal; and switch means mounted on a top surface of the horizontal upper extent of the drill, the switch means having a first orientation for only allowing the transmission of the activation signal to the drill chuck, a second orientation for only allowing the transmission of the activation signal to the vacuum assembly, and a third orientation for only allowing the transmission of the activation signal to both the drill chuck and vacuum assembly.

2. A drill vacuum combination comprising:

a drill having an inverted L-shaped configuration with a vertical handle including a trigger for generating an activation signal upon the depression thereof, the drill further having a horizontal upper extent with a rotating adjustable drill chuck rotatably mounted to a front face thereof and adapted to releasably receive a drill bit therein, the drill chuck adapted to rotate during the receipt of the activation signal;

a tube situated in concentric relationship with the drill chuck;

a vacuum assembly mounted on the drill and in communication with the tube for generating a vacuum upon the receipt of the activation signal; and switch means mounted on the drill, the switch means having a first orientation for only allowing the transmission of the activation signal to the drill chuck, a second orientation for only allowing the transmission of the activation signal to the vacuum assembly, and a third orientation for allowing the transmission of the activation signal to both the drill chuck and vacuum assembly.

3. A drill vacuum combination as set forth in claim 2 wherein the vacuum assembly includes a sealed container mounted on the drill, the container having an interior space which resides in communication with the tube, the vacuum assembly further including a vacuum bag situated within the container with an opening removably connected in communication with the tube with the bag being air permeable, wherein the vacuum pump is adapted for creating a vacuum within the container, bag and cylindrical tube upon the receipt of the activation signal.

4. A drill vacuum combination as set forth in claim 2 wherein the tube is bellowed and connected to the drill such that the tube extends along an entire length of the drill bit.

5. A drill vacuum combination as set forth in claim 2 wherein the tube is removably coupled to the drill.

6. A drill vacuum combination as set forth in claim 2 wherein an end of the tube has a rigid sleeve with a locking means for releasably coupling with a locking means mounted on an annular sleeve of the drill.

7. A drill vacuum combination as set forth in claim 2 wherein the tube is transparent.

8. A drill vacuum combination as set forth in claim 2 wherein the tube has measurement indicia printed along a length thereof.

9. A drill vacuum combination comprising:

a drill having an inverted L-shaped configuration with a vertical handle including a trigger for generating an activation signal upon the depression thereof, the drill further having a horizontal upper extent with a rotating adjustable drill chuck rotatably mounted to a front face thereof and adapted to releasably receive a drill bit therein, the drill chuck adapted to rotate during the receipt of the activation signal;

a tube having a sleeve mounted on an inboard end thereof which is adapted for being removably situated in concentric relationship with the drill chuck; and a vacuum assembly mounted on the drill and in communication with the tube for generating a vacuum upon the receipt of the activation signal;

said vacuum assembly including a sealed container mounted on an underside of the drill, the container having an interior space which resides in communication with the tube via a conduit which is attached to the annular sleeve, the vacuum assembly further including a vacuum bag situated within the container with an opening removably connected in communication with the tube with the bag being air permeable, wherein the vacuum pump is adapted for creating a vacuum within the container, bag and cylindrical tube upon the receipt of the activation signal;

wherein the tube has measurement indicia printed along a length thereof.

10. A drill vacuum combination as set forth in claim 9 wherein the tube is bellowed and connected to the drill such that the tube extends along an entire length of the drill bit.

11. A drill vacuum combination as set forth in claim 9 wherein the tube is transparent.

\* \* \* \* \*